US007814308B2

(12) United States Patent
Templin et al.

(10) Patent No.: US 7,814,308 B2
(45) Date of Patent: Oct. 12, 2010

(54) DEBUGGING APPLICATIONS UNDER DIFFERENT PERMISSIONS

(75) Inventors: David Kehl Templin, Issaquah, WA (US); Gregory Darrell Fee, Seattle, WA (US); Izydor Gryko, Sammamish, WA (US); James Gordon Cantwell, Sammamish, WA (US); Michael Eng, Bellevue, WA (US); Sean Conway Draine, Seattle, WA (US); Stephanie Sweeny Saad, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 10/929,129

(22) Filed: Aug. 27, 2004

(65) Prior Publication Data

US 2006/0048099 A1   Mar. 2, 2006

(51) Int. Cl.
*H04L 9/00* (2006.01)
(52) U.S. Cl. .................. 713/152; 713/166; 726/22; 717/117; 717/124; 717/127; 718/100
(58) Field of Classification Search .......... 713/166, 713/189; 717/117, 124, 127; 726/22, 1, 726/2, 26, 27
See application file for complete search history.

(56) References Cited

U.S. PATENT DOCUMENTS

| | | | | |
|---|---|---|---|---|
| 5,583,988 | A * | 12/1996 | Crank et al. | 714/48 |
| 6,567,918 | B1 * | 5/2003 | Flynn et al. | 726/7 |
| 6,691,230 | B1 * | 2/2004 | Bardon | 726/27 |
| 6,708,276 | B1 * | 3/2004 | Yarsa et al. | 726/6 |
| 6,981,281 | B1 * | 12/2005 | LaMacchia et al. | 726/27 |
| 7,003,762 | B2 * | 2/2006 | Krueger | 717/126 |
| 7,076,557 | B1 * | 7/2006 | LaMacchia et al. | 709/229 |
| 7,131,111 | B2 * | 10/2006 | Passanisi | 717/121 |
| 7,418,697 | B2 * | 8/2008 | Gryko et al. | 717/124 |
| 2002/0099952 | A1 * | 7/2002 | Lambert et al. | 713/200 |
| 2003/0028685 | A1 * | 2/2003 | Smith et al. | 709/328 |
| 2003/0041267 | A1 * | 2/2003 | Fee et al. | 713/201 |
| 2003/0221185 | A1 * | 11/2003 | Bates et al. | 717/125 |
| 2004/0148514 | A1 * | 7/2004 | Fee et al. | 713/200 |
| 2004/0237064 | A1 * | 11/2004 | Liu et al. | 717/101 |
| 2004/0250175 | A1 * | 12/2004 | Draine et al. | 714/46 |
| 2005/0097440 | A1 * | 5/2005 | Lusk et al. | 715/500.1 |
| 2005/0108521 | A1 * | 5/2005 | Silhavy et al. | 713/156 |
| 2005/0246773 | A1 * | 11/2005 | Draine et al. | 726/22 |
| 2005/0278790 | A1 * | 12/2005 | Birk et al. | 726/26 |

OTHER PUBLICATIONS

Support@iona.com, Running Orbix Java Clients, www.iona.com, 2000, pp. 1-7.*

(Continued)

*Primary Examiner*—Nasser Moazzami
*Assistant Examiner*—Shanto M Abedin
(74) *Attorney, Agent, or Firm*—Woodcock Washburn LLP (57) ABSTRACT

A system and method that allows developers to debug a component while it is restricted by any arbitrary set of specific permissions, or restricted by an existing permission set associated with a security "zone." A security sandbox is mimicked within the development environment so that developers can study how applications perform inside the sandbox. Developers are able create any sandbox and debug inside it, where violating any bound of the artificial sandbox will throw a security exception and drop the user out on the exact line of code which generated the error, as well as provide helpful information about how to correct the error.

19 Claims, 8 Drawing Sheets

OTHER PUBLICATIONS

Peterson et al, A Flexible Containment Mechanism for Executing Untrusted Code, USENIX, 2002, pp. 1-19.*

Valentin Razmov, Security in Untrusted Code Environments: Missing Pieces of the Puzzle, University of Washington, 2002, pp. 1-22.*

Downing et al, Dictionary of Computer and Internet Terms, 2000, pp. 1-3, 68-69, 122-123, 166-167, 290-291, 424-425, 468-469, 492-493.*

Aviel D. Rubin et al, Mobile Code Security, pp. 30-34, 1998 IEEE.*

David L. Black et al, "The Mach Exception Handling Facility", pp. 45-56, ACM SIGPLAN and SIGOPS workshop, 1988.*

Aviel D. Rubin, "Mobile Code Security", pp. 30-34, Internet Computing, IEEE, 1998.*

David M. Wheeler, "Java Security Extensions for a Java Server in a Hostile Environment", pp. 1-10 , Computer Security Applications Conference, 2001.*

Li Gong, Java 2 Platform Security Architecture, Version 1.0, pp. 1-70, Sun Microsystems, Inc., Oct. 1998.*

Jaeger, T. et al., "Policy Management Using Access Control Spaces", *ACM Transactions on Information and System Security*, Aug. 2003, 6(3), 327-364.

Koved, L. et al., "Access Rights Analysis for Java", *OOPSLA*, 2002, 359-372.

Swift, M.M. et al, Improving the Granularity of Access Control for Windows 2000,*ACM Transactions on Information and System Security*, Nov. 2002, 5(4), 398-437.

* cited by examiner

DEBUGGING APPLICATIONS UNDER DIFFERENT PERMISSIONS

FIELD OF THE INVENTION

This invention relates in general to the field of computer software. More particularly, this invention relates to a system and method of providing an environment within which software developers can debug software that will be restricted by security permissions upon use by an end user.

BACKGROUND OF THE INVENTION

Installing and running applications can be a scary thing in today's world of connected computers and the Internet. How can users trust that an application will only do what it is supposed to do? Cautious users understand they need to be careful about what software they allow onto their system. Paranoid users will re-evaluate whether they really need that software in the first place, many choosing to abstain upon reconsideration. Developers are concerned because users may be unlikely to even give an application a try due to these factors.

To help protect computer systems from malicious code or code from unknown origins, and to help prevent trusted code from intentionally or accidentally compromising security, the .NET FRAMEWORK (available from MICROSOFT CORP., Redmond, Wash.) provides a security mechanism called code access security (CAS). Code access security allows code to be run in a "secure sandbox" and for users to trust the code to varying degrees in accordance with "security zones" (e.g., MyComputer, Intranet, or Internet, etc.) depending on where the code originates and on other aspects of the code's identity. Code access security also enforces the varying levels of trust on code such that an application from the Internet could never reformat the hard drive, etc.

During the software development process, development tools and code run on the local machine with little or no security restrictions. This creates the problem of errors that are often encountered when the code is run on an end user's machine under the restricted permissions in the secure sandbox. In particular, there is a lack of development tools for setting up a secure sandbox within with an application can be run that also includes a suite of development and debugging tools. This makes it hard for developer's to determine why their code fails when running in the secure sandbox under CAS.

Thus, there is a need for a system of for debugging applications as they execute in a secure sandbox. There is also a need for debugging tools that can simulate various levels of security restrictions placed on the secure sandbox. The present invention provides such a solution to these and other needs in the art.

SUMMARY OF THE INVENTION

The present invention allows developers to debug a component while it is restricted by any arbitrary set of specific permissions (specified by the developer), or restricted by an existing permission set associated with a security "zone" (e.g. security restrictions associated with the "Internet" zone). In particular, the present invention is directed to a feature of a development tool that mimics a security sandbox inside the development environment, so that developers can study how applications perform inside the sandbox. Developers are able create any sandbox and debug inside it, where violating any bound of the artificial sandbox will throw a security exception and drop the user out on the exact line of code which generated the error, as well as provide helpful information about how to correct the error.

In accordance with the present invention, there is provided a system for debugging a software application under a restricted security context. The system includes a project system for developing an application, a deployment system for deploying applications to users, a debugger that observes run-time behavior of the application and evaluates instructions within the application, and a hosting process for running the application. During development of the application, the hosting process executes the application under the restricted security context and the debugger provides an indication of an occurrence of a security exception.

Manifests may be created that contain information regarding the restricted security context. The manifest includes permissions that correspond to security zones within which the software application is to be deployed. Attributes may further define the permissions.

A manager object manages the execution of applications in the restricted security context in accordance with the manifests. A runtime environment, in which the application executes, receives the information from the manifests from the manager object. A context object that allows or disallows passes to the runtime environment in accordance with the information from the manifests. A security object that determines if any function calls by the application require greater permissions than specified by the information in the manifest. If so, the security object creates the security exception. The occurrence of the security exception results in the debugger exiting the application at an instruction that generated the security exception.

In accordance with the present invention, a user interface may be provided to define the restricted security context. Predefined security zones may also be provided in the user interface.

In accordance with another aspect of the invention, there is provided a method for debugging a software application under a restricted security context. The method includes executing the software application in a debugging environment; applying the restricted security context to the software application; and providing an indication of an occurrence of a security exception.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
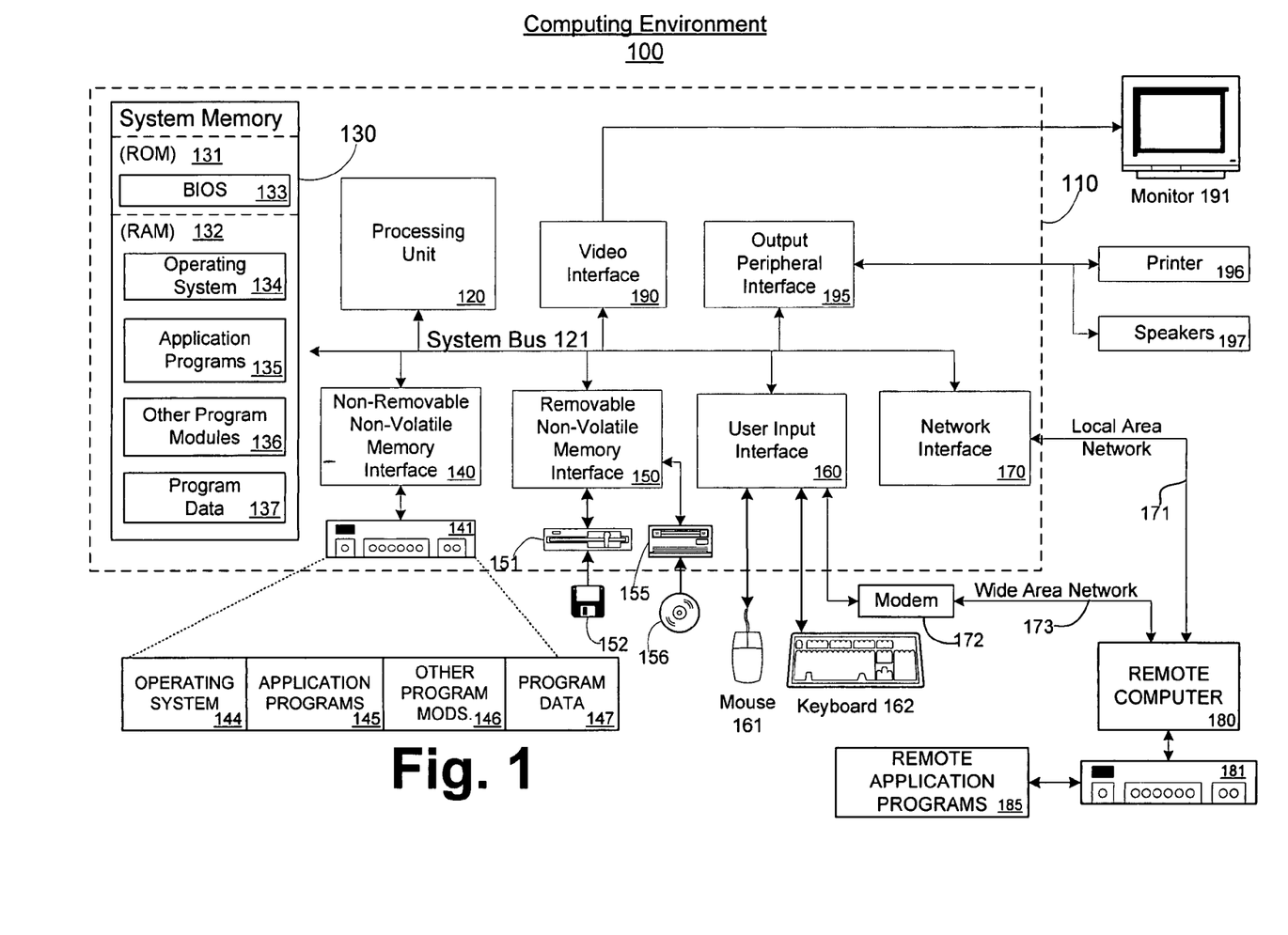
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of Debugging Applications Under Different Permissions

The present invention improves the software development experience for developers writing applications that will be used within a secure sandbox by allowing a developer to specify the security context, or "zone", for the application to run under during build/debug.

Figure 2:
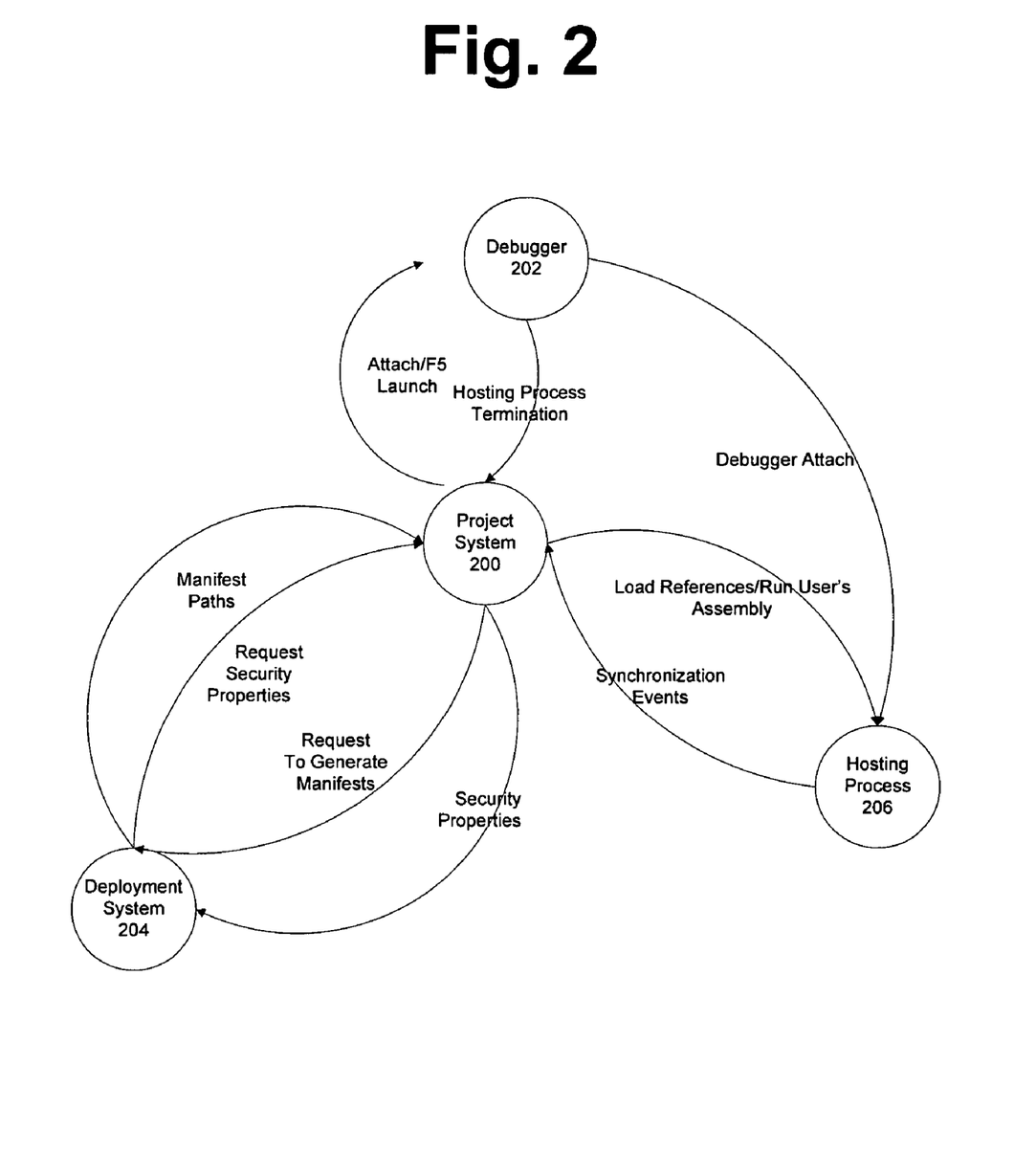
FIGS. 2-3 are block diagrams of a project system, debugger, deployment system and hosting process.
Figure 3:
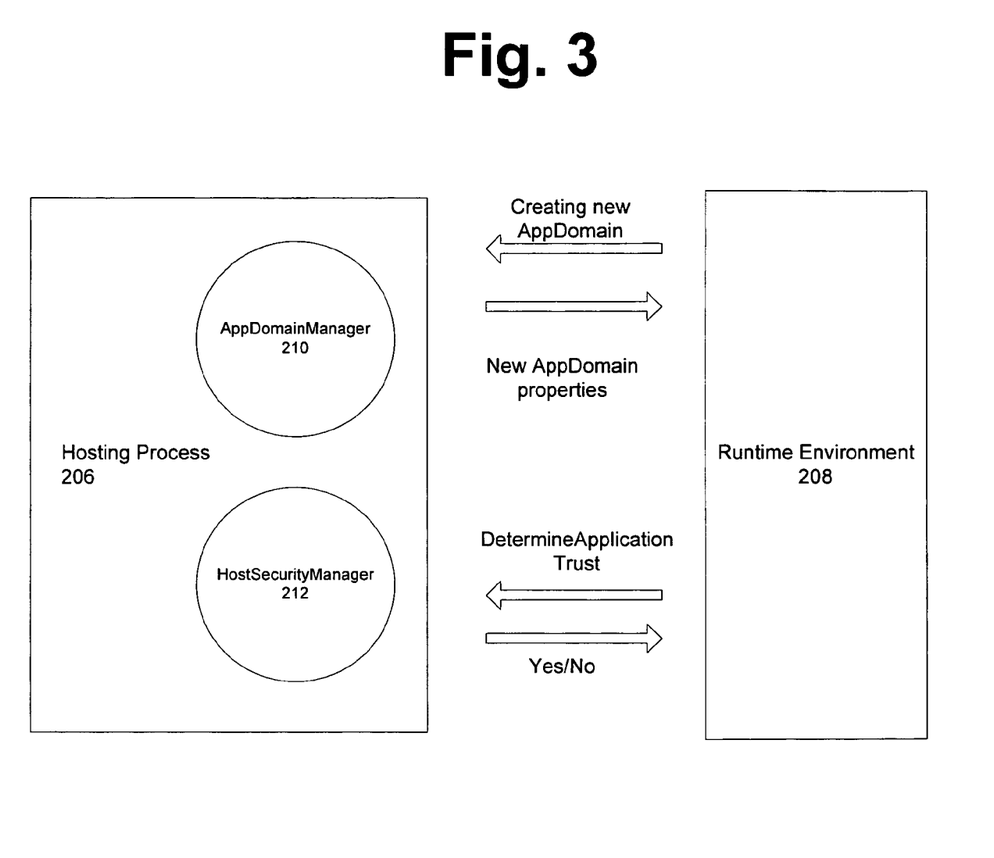

Referring now to FIGS. 2-3, the present invention is implemented via a combination of a project system 200, a debugger 202, a deployment system 204 and a hosting process 206. The project system 200 is preferably a comprehensive development tool for building and integrating Web services and applications. For example, the project system 202 is an environment in which a user develops an application. An example of such a project system 200 includes a rapid application development (RAD) tool such as MICROSOFT VISUAL STUDIO. VISUAL STUDIO facilitates the development of software applications in languages such as VISUAL C# .NET, VISUAL J# .NET, and VISUAL BASIC .NET.

The debugger 202 allows the developer to observe the run-time behavior of a program and determine the location of semantic errors. The debugger 202 understands features that are built into programming languages and their associated libraries. With the debugger 202, developers can break (suspend) execution of a program to examine the code, evaluate and edit variables in the program, view registers, see the instructions created from the source code, and view the memory space used by the application.

The project system 200 calls the deployment subsystem 204. The deployment subsystem preferably allows developers to deploy applications to a desktop by placing the application files on a Web or file server accessible to the client and providing the user with a link. When the user clicks the link on a Web page or in an e-mail, the application files are downloaded to the user's machine and executed within the secure sandbox provided by, e.g., code access security (CAS).

When the deployment subsystem 204 is called, manifests are created that contain information about the security sandbox to which the application is being targeted. Manifests are put into an output directory specified by the project system 200 that is passed when it makes the call to the deployment system 204. An exemplary manifest may be as follows:

```
<?xml version="1.0" encoding="utf-8"?>
<asmv1:assembly ... >
...
  <trustInfo>
    <security>
      <applicationRequestMinimum>
        <PermissionSet class="System.Security.PermissionSet" version="1" ID="Custom">
          <IPermission class="System.Security.Permissions.FileDialogPermission, ... />
          <IPermission class="System.Security.Permissions.ReflectionPermission, ... />
          <IPermission class="System.Security.Permissions.SecurityPermission, ... />
          <IPermission class="System.Security.Permissions.UIPermission, ... />
        </PermissionSet>
        <defaultAssemblyRequest permissionSetReference="Custom" />
      </applicationRequestMinimum>
    </security>
  </trustInfo>
...
</asmv1:assembly>
```

The <IPermission> sub-elements of the <PermissionSet> element directly correspond to entries in Table 1 below, which provides an overview of existing permissions in the Local Intranet and Internet zones. The list in Table 1 is provided for exemplary purposes only and is not intended to be a limiting list of permissions. Some permission elements can define additional attributes to further customize to what level the permission is granted to the application. Other permissions may be defined, as well as other zones. Most permissions can be configured to provide tighter control on access. For example, the File I/O permission can be configured to only allow access to a specified disk path, and can be further configured to only allow read-only access.

TABLE 1

| Permission | Local Intranet | Internet |
| --- | --- | --- |
| Environment Variables Ability to access machine environment variables. | Read-only access to the "USERNAME" environment variable. | Read-only access to the "USERNAME" environment variable. |
| File Dialog Ability to access files and folders through standard file dialogs. | Unrestricted | Only allowed to open files through the file dialog. |
| File I/O Ability to access the file system. | None | None |
| Isolated Storage File Ability to access managed storage facility, offers functionally similar to cookies for .NET applications. | Data is isolated by assembly, no maximum, data is permanent. | Data stored by domain, 10K maximum, data is temporary. |
| Reflection Ability to discover type information about assemblies at runtime. | Reflection on methods, properties, and types is not allowed. | None |
| Registry Ability to access the system registry. | None | None |
| Security Controls various factors such as whether or not to allow execution of managed or native code. | Allow managed code execution. | Only allow execution of managed code. |
| User Interface Ability to show dialogs and windows. | Unrestricted | Restricted to prevent potentially harmful code from spoofing attacks, such as imitating trusted system dialogs. |
| DNS Ability to resolve Internet names or use URL addresses like www.microsoft.com. | Granted | None |
| Printing Ability to print from an application. | Can print automatically to the default printer. Can also print by showing the standard print dialog box. | Can only print by showing the standard print dialog box. |
| Socket Access Ability to connect or accept access through sockets. | None | None |
| Web Access Ability to access web sites. | Same site/protocol access only. | Same site/protocol access only. |
| Event Log Ability to write into the system event log. | None | None |
| Performance Counter Ability to write system performance counter data. | None | None |
| OLE DB Ability to access a database through OLE DB. | None | None |
| SQL Client Ability to access a SQL Server database. | None | None |

The project system 200 then launches the Hosting Process 206, which is a process for running the user application. The project system 200 then calls the debugger 202 which then attaches to the hosting process 206 to run a user's assembly. FIG. 3 is a block diagram of a system illustrating the relationships between the hosting process 206 and a runtime environment 208, where the user's assembly is executed. The project system 200 issues instructions to the hosting process 206 to load the runtime environment 208 begin executing an application to be debugged. The runtime environment 208 may be the NET common language runtime (CLR) environment.

An AppDomainManager 210 is an object created by the hosting process 206. The runtime environment 208 queries this object whenever it creates a new AppDomain to configure the appdomain. An AppDomain is an isolated environment where applications execute. A HostSecurityManager 212 is an object created by the hosting process 206. The runtime environment 208 retrieves this object from the AppDomainManager and queries this object whenever applications run inside an appdomain for additional security context information.

In order to create the restricted security test environment, the hosting process 206 implements an implementation of the AppDomainManager and the HostSecurityManager. The AppDomainManager is a specific class that is called by the runtime environment 208 whenever an appdomain is created.

It provides the runtime environment 208 with specific details and properties about the appdomain and how it should be created. The hosting process 206 implements the AppDomainManager class and it indicates to the runtime environment 208 the specific security permissions that should be granted and denied to applications running in the default appdomain for the hosting process 206. It is here that the hosting process 206 passes the security stored in the manifest files to the runtime environment 208.

This AppDomainManager implementation overrides two main functions over the conventional implementation of the hosting process. It first overrides the InitializeNewDomain function, where it gives the runtime the security contents from the manifest files through an ApplicationContext object. The hosting process creates an ApplicationContext object with details of the security permissions to allow/disallow and passes that to the runtime environment 208. The hosting process AppDomainManager also overrides the HostSecurityManager property. When the runtime environment 208 requests this property from the AppDomainManager 210, it returns the HostSecurityManager 212.

The HostSecurityManager 212 provides additional security related information to the runtime environment 208 whenever applications are run (in this case when the user's application is run). The HostSecurityManager class provided by the hosting process overrides the DetermineApplicationTrust function. Once the AppDomain is set up with the restricted permissions, the application to be debugged runs within it. At this point, any function calls that require greater permissions than what was granted to the user will result in security exceptions that show up in the debugger.

The following information may be passed to the hosting process 206 to set up the sandbox: an assembly name, command line parameters, the manifest locations and a URL. The hosting process 206 in turn calls a .NET runtime function Activator.CreateInstance( ) with the ApplicationContext and the NET runtime begins running the user's application within the restricted AppDomain.

If an exception occurs during the application run, the user is dropped out on the line of code where the security exception occurs. A Security Exception Helper facilitates fixing these errors. This is a non-modal popup inline with the code which contains information about the exception (i.e. System.SecurityException.FileIOPermission) and helpful hints on how to correct the problem.

The advantage of this model is that it gives the user granular information to make an informed decision about how to correct the problem, either by (1) changing the code, (2) increasing the size of the sandbox by assigning more permissions to the targeted zone on targeted machines, (3) deploying specific security policy on targeted machines that the application can be trusted. Users can iteratively work through their applications until they are satisfied that the application will not generate disruptive security exceptions in production.

Functions Implemented on the Hosting Process 206

The RegisterCallback function is called by the design-time environment when the hosting process is first created. The RegisterCallback function will register a callback interface to be used for communication between the system's implementation of the hosting process and the system. The RegisterCallback function can be called multiple times. If the implementer already has a registered callback pointer, then the existing pointer is released. The RegisterCallback function is a synchronous function.

The UnregisterCallback function is called by the design-time environment when the system needs to break the reference to the callback without shutting down the hosting process. In the UnregisterCallback function, the hosting process is responsible for releasing the pointer given to it as part of RegisterCallback function. In one embodiment, the UnregisterCallback function is called in the Detach scenario. In the Detach scenario, a use can stop debugging the application and the application will continue running. The UnregisterCallback function is a synchronous function.

The PrepareAppDomain function is called as part of pre-debugging initialization in order to create an application domain with an appropriate configuration file. The user's application executes in the created domain. The single parameter to this function specifies the path to the configuration file. If the PrepareAppDomain function is called multiple times for a single hosting process, then only the first call will have any effect. If the system detects that a previous call to this function has been made, then such a condition is treated as neither success nor failure. The PrepareAppDomain function is an asynchronous function.

The LoadReferences function is called as part of pre-debugging initialization in order to pre-load indicated references before commencement of the debugging process. The references are loaded into the same application domain as the executing assembly. The LoadReferences function takes an array of strings as a parameter, and each string represents a reference to be loaded into the created AppDomain. Note that after the LoadReferences function completes, each successfully loaded assembly is locked on disk. The LoadReferences function is an asynchronous function.

In an exemplary embodiment of the invention, it is envisioned that a RemoveReferences( ) function is called by the system whenever a reference that matters to the hosting process (preloaded reference) is removed from the system. The RemoveReferences( ) function removes the indicated references from the AppDomain. The RemoveReferences( ) function is a synchronous function.

The EnsureHostProcReady function is called to ensure that all pending requests to PrepareAppDomain and LoadReferences are completed. This function is invoked by the system right before debugging is started. This function's implementation waits until the PrepareAppDomain request, as well as all requests to LoadReferences, are completed. The EnsureHostProcReady function is a synchronous function.

The LoadAndRunAssembly function is called to start executing the user's application code inside the hosting process. Parameters to this function include: pszAssemblyPath, which specifies the full path of the filename that contains the user's application code to be executed; lpszCmdLineArgs, which specifies command-line arguments to be passed to the user's executable; and bDebugInZone, which specifies whether or not the user's application will run with custom security permissions. The lpszCmdLineArgs parameter is a string. The LoadAndRunAssembly function is responsible for parsing this string appropriately and for giving each argument to the runtime separately. Additional parameters include lpszAppManifestPath, lpszDeployManifestPath, lpszDebugInZoneURL. Combined, these three parameters are used to indicate which custom security zone the user's assembly will be running in. In one embodiment, if the LoadAndRunAssembly function is called while there are any pending requests from PrepareAppDomain or LoadReferences, an appropriate error value is returned. The LoadAndRunAssembly function is an asynchronous function.

The following are the scenarios that may be implemented in accordance with the present invention:

1. A developer develops an application which is going to be installed by many different users. The developer knows that the zones selected by users during install will run the gamut. The developer would like the application to work under all modes except for internet. The developer iteratively builds/debugs the application, testing to ensure the application works for each of the different zones.

2. A developer wants to make sure her application works in all scenarios, so she sets the build settings to "internet", to ensure that the application still works even in the lowest-permission scenario.

3. A developer wishes to deploy and run her application with the minimum required permission set so as to reduce risk if the application is repurposed by a malicious agent attempting to harm the users machine.

4. A network administrator wishes to restrict applications from accessing particular resources on a desktop PC in order to reduce maintenance and support costs, and he uses CAS to enforce this policy. Developers targeting this environment remove the specified permissions from their application and debug with the reduced permission set to ensure their application meets the administrator's requirements.

Exemplary User Interface

The project system 200 sets up the security sandbox is via Project Property Pages (FIG. 4), where the user selects the following attributes: a URL which should be used as the basis for setting up the sandbox, and the permissions which are to be assigned to each zone, where a default permission set may be predefined. The URL is used to establish which zone the application will run in. For instance, if the URL is set to http://msw, then the application will launch and run under the debugger in the Intranet zone, whereas if the URL is set to http://www.examplesite.com, then the application will launch and run under the debugger in the Internet zone.

Figure 4:
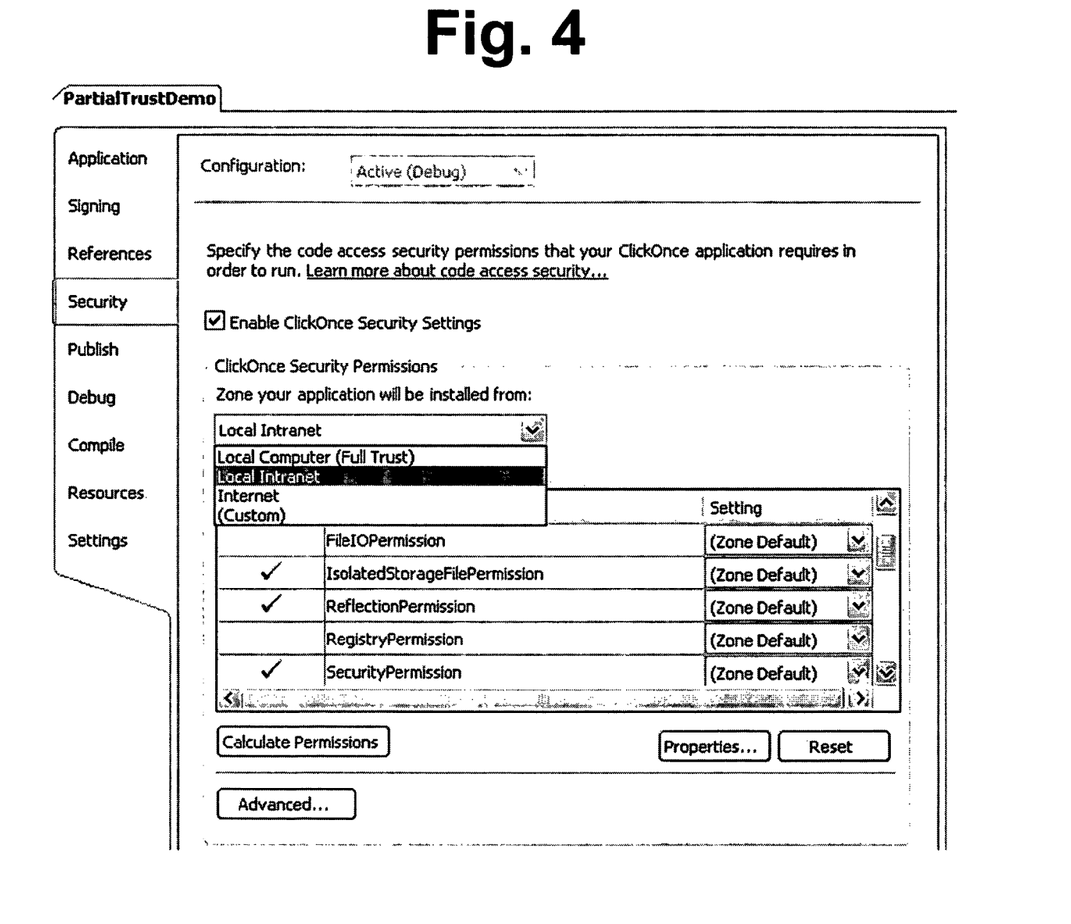
FIGS. 4-8 are exemplary user interfaces in accordance with the present invention.

The Permissions picker allows the user to select the permissions which should be assigned for each zone for the application to run correctly. For instance, the user can select the Intranet zone and specify that Intranet includes registry read/write permission (although this is not part of the defaults). Selecting "Run" (or pressing F5) will then launch the application in the sandbox.

Figure 5:
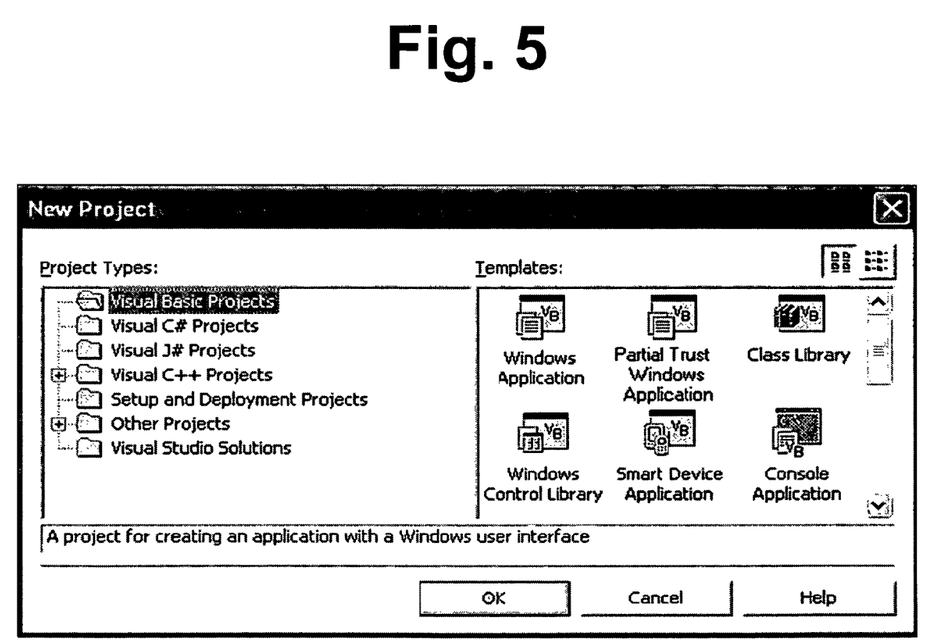
Figure 6:
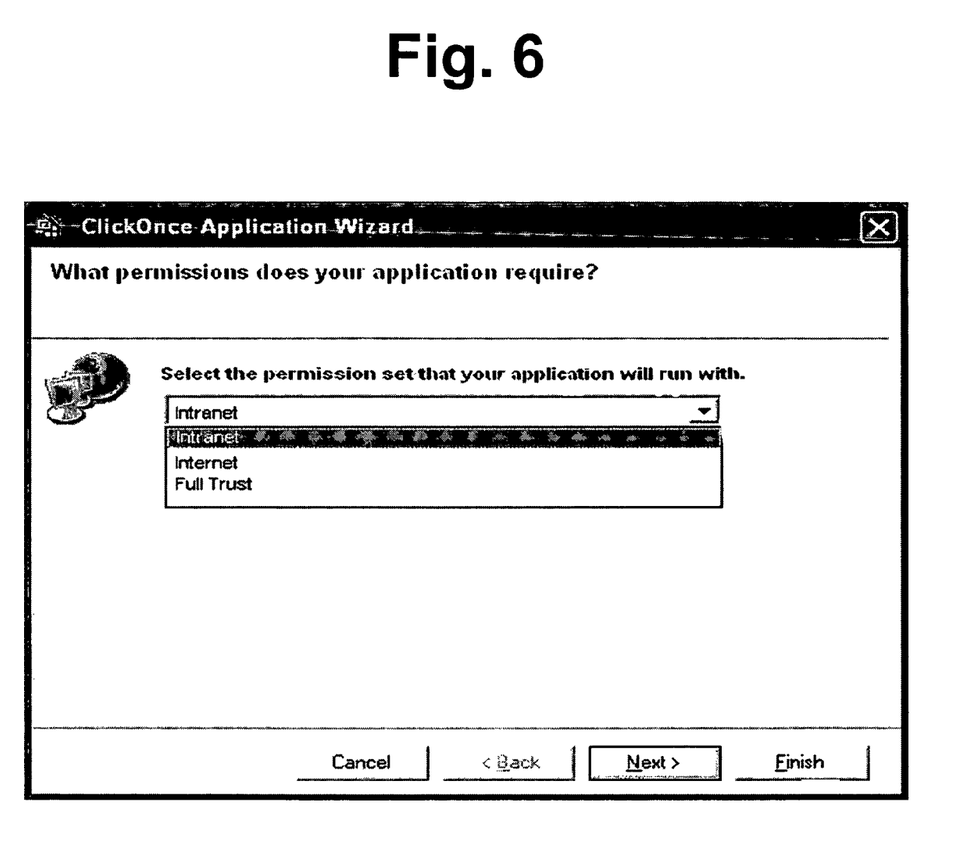
Figure 7:
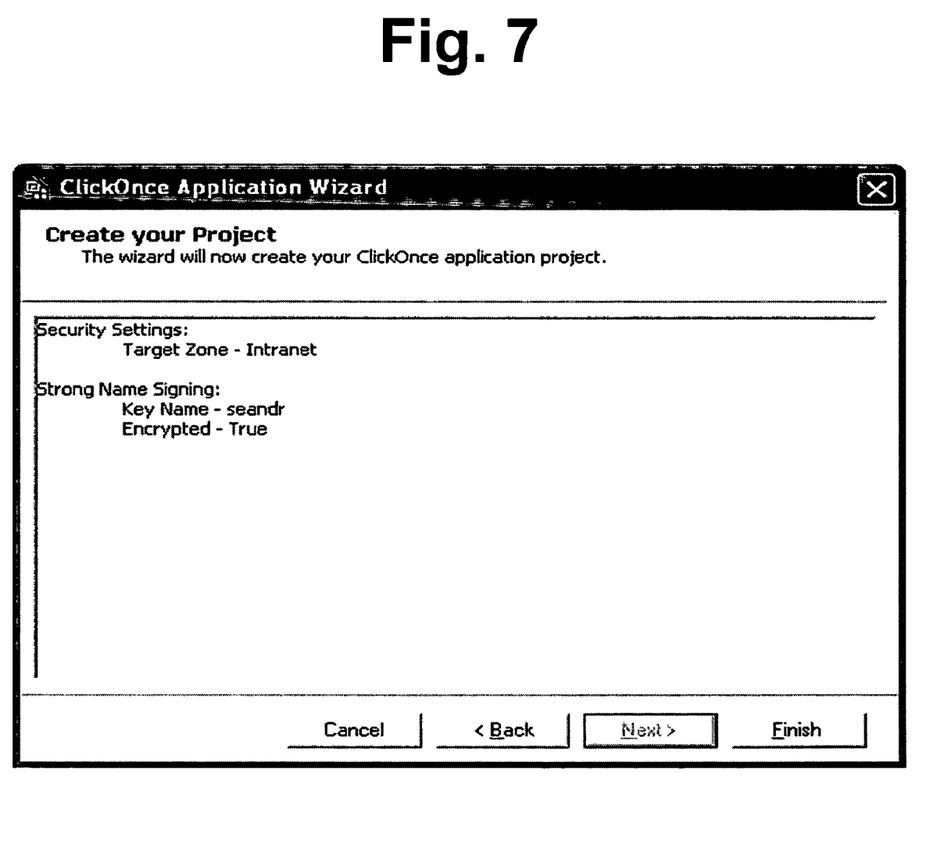
Figure 8:
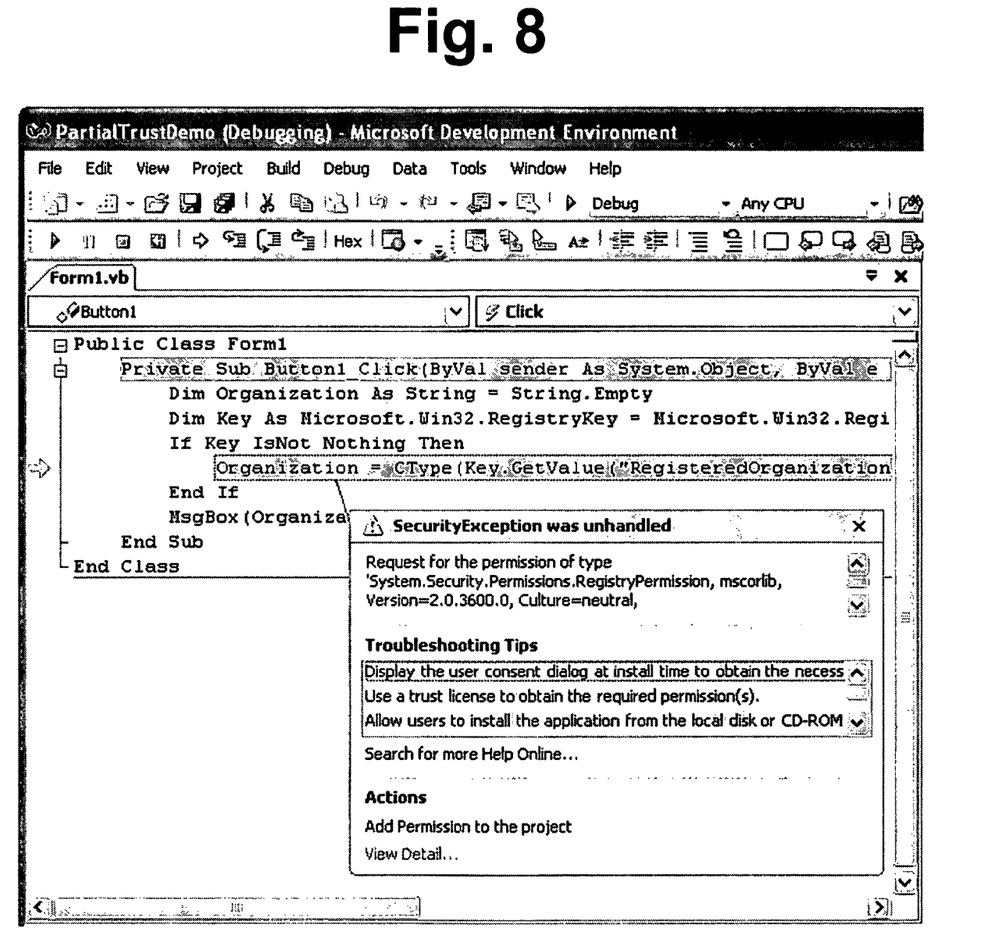

FIG. 5 illustrates a new project wizard UI from which a template for the new project can be selected (e.g., Partial Trust Windows Application). As shown in FIG. 6, the user may then select the security to which the application is targeted. This pane allows the developer to state which security zone they are targeting. The choices are, e.g., Internet, Intranet, or Full Trust. Other choices may be provided. The debugger 202 will run the application with the code access security permissions associated with the selected zone. If the application attempts some operation that falls outside the zone, the application will throw a security exception, as noted above. FIG. 7 illustrates a summary of the options selected by the user. FIG. 8 illustrates a user interface showing an exception assistant that highlights where a security exception has occurred.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A system for debugging an application under a restricted security context, comprising:

a computing processor;

memory communicatively coupled with said computing processor, said memory comprising:

executable instructions for providing an electronic user interface adapted to receive inputs defining an artificial restricted security context that is simulated during execution of a software application in a debugger, the artificial security context defining a security zone and memory read/write restrictions that are to be simulated in the debugger;

a manifest stored in the memory, the manifest comprising information defining the artificial restricted security context that is simulated during execution of a software application in a debugger;

executable instructions for a debugger that observes runtime behavior of said software application, evaluates instructions within said software application, allows for editing of variables in the program, allows for viewing instructions of the software application, allows for viewing memory space used by the software application, and allows for suspending the execution of the software application; and executable instructions for a hosting process for running said software application in the debugger, wherein said hosting process executes said software application in the debugger under said artificial restricted security context defined in the manifest and identifies an occurrence of a security exception to said artificial restricted security context, the security exception indicating a failure to observe the security zone or memory read/write restrictions, and wherein in response to identifying in the debugger an indication of the occurrence of a security exception, said debugger pauses the execution of said software application, electronically communicates information identifying code of said software application corresponding to the security exception, and electronically communicates information about the security exception.

2. The system of claim 1, wherein said manifest comprises permissions that correspond to security zones within which said software application is to be deployed.

3. The system of claim 2, wherein said permissions contain attributes that further define said permissions.

4. The system of claim 1, wherein said hosting process creates a manager object that manages the execution of said application in said restricted security context in accordance with said manifest.

5. The system of claim 4, further comprising a runtime environment, wherein said runtime environment receives said information in said manifest from said manager object.

6. The system of claim 5, further comprising a context object that allows or disallows passes to said runtime environment in accordance with said information in said manifest.

7. The system of claim 5, further comprising a security object that determines if any function calls by said application require greater permissions than specified by said information in said manifest, and wherein said security object creates said security exception.

8. The system of claim 1, wherein said occurrence of said security exception results in said debugger exiting said application at an instruction that generated said security exception.

9. The system of claim 1, wherein predefined security zones are provided in said user interface.

10. A computer-implemented method for debugging a software application under a restricted security context, comprising:
   providing an electronic user interface adapted to receive inputs defining an artificial restricted security context that is simulated during execution of a software application in a debugger, the artificial security context defining a security zone and memory read/write restrictions that are to be simulated in the debugger;
   electronically receiving in memory a manifest, the manifest comprising information defining the artificial restricted security context that is simulated during execution of a software application in a debugger;
   executing said software application in a debugger, the debugger providing for observing run-time behavior of said software application, evaluating instructions within said software application, editing of variables in the program, viewing instructions of the software application, viewing memory used by the software application, and suspending the execution of the software application;
   electronically simulating said artificial restricted security context defined in the manifest during execution of said software application in the debugger;
   electronically identifying an occurrence of a security exception to said artificial restricted security context during execution of said software application in the debugger, the security exception indicating a failure to observe the security zone or memory read/write restrictions; and
   in response to identifying in the debugger an indication of the occurrence of a security exception, pausing the execution of said software application in the debugger, electronically communicating in the debugger information identifying code of said software application corresponding to the security exception, and electronically communicating in the debugger information about the security exception.

11. The method of claim 10, wherein said manifest comprises permissions that correspond to security zones within which said software application is to be deployed.

12. The method of claim 11, wherein said permissions contain attributes that further define said permissions.

13. The method of claim 10, further comprising creating a manager object that manages the execution of said software application in said restricted security context in accordance with said manifest.

14. The method of claim 13, further comprising communicating said information in said manifest to a runtime environment.

15. The method of claim 14, further comprising creating a context object that allows or disallows passes to said runtime environment in accordance with said information in said manifest.

16. The method of claim 14, further comprising creating a security object that determines if any function calls by said software application require greater permissions than specified by said information in said manifest, and if so, generating said security exception.

17. The method of claim 10, further comprising exiting said application at an instruction that generated said security exception.

18. The method of claim 10, wherein predefined security zones are provided in said user interface.

19. A computer-readable storage medium comprising computer-executable instructions adapted to perform a computer-implemented method of debugging a software application under a restricted security context, the method comprising:
   providing an electronic user interface adapted to receive inputs defining an artificial restricted security context that is simulated during execution of a software application in a debugger, the artificial security context defining a security zone and memory read/write restrictions that are to be simulated in the debugger;
   electronically generating in memory a manifest, the manifest comprising information defining the artificial restricted security context that is simulated during execution of a software application in a debugger;
   electronically executing the software application in a debugger, the debugger providing for observing run-time behavior of said software application, evaluating instructions within said software application, editing of variables in the program, viewing instructions of the software application, viewing memory used by the software application, and suspending the execution of the software application;
   electronically generating an object for determining during execution of the software application in the debugging environment if any function calls by the software application require permissions other than as specified by the artificial restricted security context defined in the manifest;
   the object identifying an occurrence of a security exception to the artificial restricted security context during execution of the software application in the debugger, the security exception indicating a failure to observe the security zone or memory read/write restrictions; and
   in response to identifying in the debugger an indication of the occurrence of a security exception, pausing the execution of said software application in the debugger, electronically displaying in the debugger the line of code that resulted in the security exception, electronically displaying in the debugger information about the security exception, and electronically displaying in the debugger information regarding correcting the line of code.

* * * * *